(12) United States Patent
Polyakov et al.

(10) Patent No.: US 7,969,440 B1
(45) Date of Patent: Jun. 28, 2011

(54) METHOD AND SYSTEM FOR CURVE FITTING USING DIGITAL FILTERING

(75) Inventors: Vladislav Polyakov, Los Gatos, CA (US); Boris Gorbatov, Sunnyvale, CA (US); Fedor Trushkin, Moscow (RU); Alexander Pashintsev, Cupertino, CA (US)

(73) Assignee: EverNote Corporation, Sunnyvale, CA (US)

( * ) Notice: Subject to any disclaimer, the term of this patent is extended or adjusted under 35 U.S.C. 154(b) by 908 days.

(21) Appl. No.: 11/906,454

(22) Filed: Oct. 1, 2007

Related U.S. Application Data

(63) Continuation-in-part of application No. 11/799,946, filed on May 2, 2007.

(51) Int. Cl.
G06T 11/20 (2006.01)
G06T 11/00 (2006.01)

(52) U.S. Cl. .................................. 345/442; 345/467
(58) Field of Classification Search .................. 345/442, 345/467
See application file for complete search history.

(56) References Cited

U.S. PATENT DOCUMENTS

| | | | | |
|---|---|---|---|---|
| 5,237,649 | A | * | 8/1993 | Yamada .................. 345/442 |
| 5,473,472 | A | | 12/1995 | Temme et al. |
| 5,473,742 | A | * | 12/1995 | Polyakov et al. ............ 345/442 |
| 5,608,856 | A | * | 3/1997 | McInally .................. 345/442 |
| 5,694,535 | A | | 12/1997 | Broekhuijsen |
| 5,731,820 | A | * | 3/1998 | Broekhuijsen ............. 345/442 |
| 6,018,591 | A | * | 1/2000 | Hull et al. ................. 382/186 |
| 6,044,171 | A | * | 3/2000 | Polyakov et al. ............ 382/159 |
| 6,101,280 | A | * | 8/2000 | Reynolds ................. 382/241 |
| 6,111,588 | A | * | 8/2000 | Newell .................... 345/442 |
| 6,115,051 | A | * | 9/2000 | Simons et al. ............. 345/442 |
| 6,304,677 | B1 | * | 10/2001 | Schuster .................. 382/264 |
| 6,404,434 | B1 | * | 6/2002 | Shimada et al. ............ 345/442 |
| 6,771,266 | B2 | | 8/2004 | Lui et al. |
| 7,079,144 | B1 | * | 7/2006 | Shimada et al. ............ 345/442 |
| 7,212,205 | B2 | * | 5/2007 | Uesaki et al. .............. 345/423 |
| 7,437,003 | B1 | | 10/2008 | Gorbatov et al. |
| 7,542,603 | B2 | * | 6/2009 | Rosel .................... 382/173 |
| 2004/0109001 | A1 | * | 6/2004 | Grandine et al. ........... 345/442 |
| 2005/0156930 | A1 | * | 7/2005 | Nishioka et al. ............ 345/442 |
| 2006/0290698 | A1 | * | 12/2006 | Wang et al. ............... 345/442 |
| 2009/0027398 | A1 | * | 1/2009 | Frisken ................... 345/442 |

FOREIGN PATENT DOCUMENTS

WO    WO 94/03853    2/1994

* cited by examiner

*Primary Examiner* — M Good Johnson
(74) *Attorney, Agent, or Firm* — Blakely Sokoloff Taylor & Zafman LLP

(57) ABSTRACT

In one embodiment, a method for curve generation includes forming an initial interpolation polygon using samples within input data as interpolation knots, and upsampling the interpolation polygon by inserting extra samples in each segment between interpolation knots. A filter is then passed throughout a sequence of samples representing the upsampled interpolation polygon. Next, the interpolation polygon is substituted with the filtered polygon converted into a next interpolation polygon using segment-by-segment transformations, where segments of the filtered polygon are delimited by consecutive samples corresponding to interpolation knots, and each segment is transformed to fit between respective interpolation knots. Further, the passing of the filter and the substitution of the current interpolation polygon are repeated until a predefined condition is satisfied, to provide fitting curves.

25 Claims, 9 Drawing Sheets

METHOD AND SYSTEM FOR CURVE FITTING USING DIGITAL FILTERING

REFERENCE TO RELATED APPLICATION

This application is a continuation in part of application Ser. No. 11/799,946, which was filed on May 2, 2007, and which is hereby incorporated by reference.

FIELD OF THE INVENTION

This invention relates generally to curve construction methods, and more particularly to curve fitting and curve design using digital filtering.

BACKGROUND OF THE INVENTION

Various methods for curve fitting and curve design have been developed in the fields of Computer Graphics and Geometric Modeling. The most actively used methods employ polynomial and piecewise-polynomial curves, such as Bezier curves and parametric splines, discussed by Gerald Farin in "Curves and Surfaces for CAGD" (Practical Guide, $5^{th}$ ed., 2002), by David Salomon in "Computer Graphics & Geometric Modeling" (1999), and by many other authors.

There are both automated and interactive procedures for fitting a spline to interpolate or approximate a sequence of data points. In a process of fitting, a number of parameters can be adjusted to produce a better spline curve, for example, in terms of 'fairness' or aesthetical pleasing. In particular, the tangent vectors at the endpoints can be modified, and the sequence of data points can be reparameterized. In case of interactive curve design, the data points themselves, along with the control points, can be moved by a user to adjust the spline curve. As noticed by Gerald Farin, many designers do not favor interactive manipulation of a control polygon and prefer to generate curves using interpolation of data points (see Gerald Farin, "Curves and Surfaces for CAGD," Section 2.4).

In case of noisy data points, the curve fitting procedures are routinely accompanied by digital filtering. Most often filtering is not involved directly into the curve generation procedure and is used as the data preprocessing step. An example can be given by a method described in the U.S. Pat. No. 6,304,677 issued to Michael Schuste and entitled Smoothing and Fitting Point Sequences. According to this patent, an initial sequence of points is divided into one or more contiguous segments, each segment is smoothed by digital filtering, and then one or more mathematical curves (in particular, splines) are fitted to each segment to form the representation of the desired curve.

It is also possible for filtering to serve both the data smoothing and curve generation steps. A technique of this type is described in the U.S. application Ser. No. 11/013,869 invented by B. E. Gorbatov et al., entitled System and Method for Handling Electronic Ink, the teachings of which are hereby incorporated by this reference. According to this technique, a fitting curve with desired sampling density is generated by filtering an upsampled polygonal representation of noisy data points. This operation is repeatedly used in the trial and error procedure of discarding excessive data points.

There are also curve generation methods, such as subdivision schemes for B-splines, comprising digital filtering as an essential part of the curve formation procedure. Several examples of using filter technology to construct subdivision schemes are discussed in Igor Guskov et al., "Multiresolution Signal Processing for Meshes" 325-334 (Proceedings of SIGGRAPH 99, Annual Conference Series, 1999); Leif Kobbelt & Robert Schroder, "A Multiresolution Framework for Variational Subdivision" 209-237 (ACM Transactions on Graphics 17(4), 1998); and Leif Kobbelt, "Discrete Fairing and Variational Subdivision for Freeform Surface Design" 142-150 (The Visual Computer 16(3-4), 2000). In one example, a subdivision procedure for cubic B-spline can start with the control polygon upsampled by inserting a zero-valued sample between each pair of original vertices and proceed with filtering. The result of filtering should be equivalent to four rounds of midpoint averaging (see Joe Warren & Henrik Weimer, "Subdivision Methods for Geometric Design. A Constructive Approach", 2002).

It should be noted that, in practice, the fitting quality of polynomial splines is not always readily acceptable for a given application. Often, laborious interactive improvement is required before the fitting quality of polynomial splines becomes acceptable.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Figure 1A:
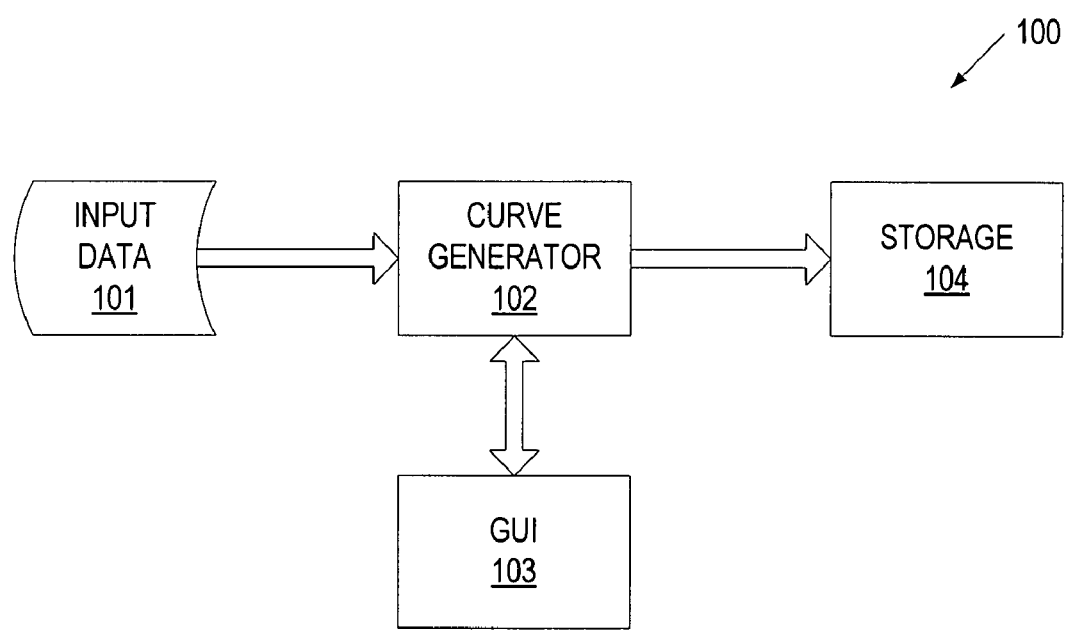
FIG. 1A is a block diagram of an exemplary system in which embodiments of the invention may operate.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

System Overview

FIG. 1A illustrates an exemplary system 100 for handling input data, in which embodiments of the invention may operate. The input data handled by the system 100 may be available in vector-graphic form, as a sequence of data points. The input data points may represent, for example, the results of laboratory experiments, the line-drawn graphics known as electronic ink, free-form sketches entered directly by a user to initiate the interactive procedure of curve design, etc.

The input data 101 is fed to a curve generator 102 that may be manipulated interactively by a user via a Graphical User Interface (GUI) 103. For example, the input data 101 may include a sequence of points provided by a graphic tablet coupled to the system 100, where each point is represented by a pair of Cartesian coordinates. In one embodiment, the curve generator 102 starts with an upsampled polygonal representation of data points and transforms it into a fitting curve by iteratively performing a cycle of global filtering-piecewise transformation, as will be discussed in more detail below in conjunction with FIGS. 3-8. In one embodiment, the resulting output is displayed in GUI 103 for a user's evaluation and response. The user may adjust settings that control the curve generator, as well as modify the number and configuration of input data points to improve a fitting curve as needed. The final output of the curve generator 102 may be stored in a storage medium 104 (e.g., in a data repository or database).

The system 100 may be hosted by a computer system such as a client device or a server. Alternatively, the storage medium 104 and the curve generator 102 may be hosted by different computer systems coupled to each other via a wired or wireless network (e.g., local network or public network).

Figure 1B:
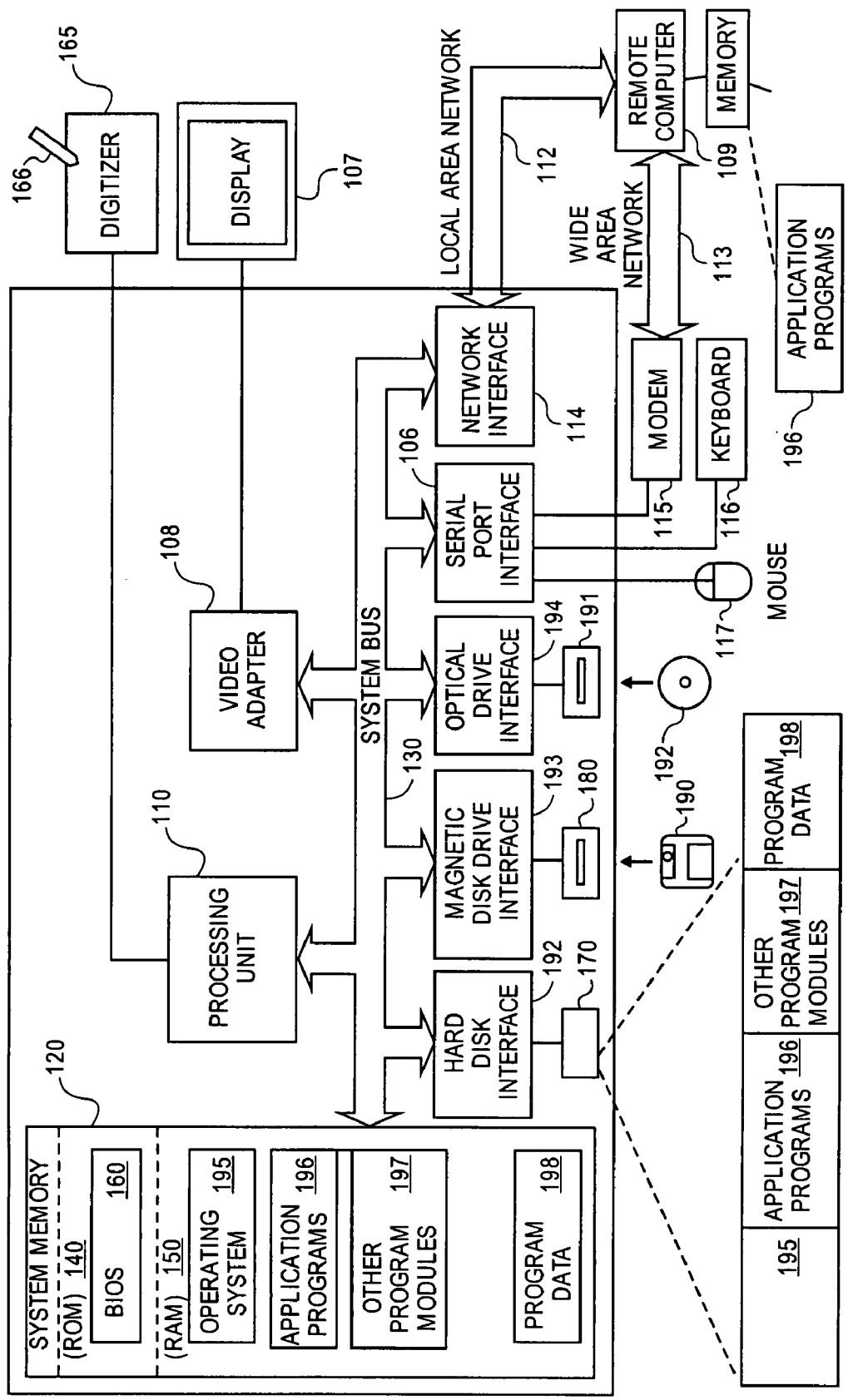
FIG. 1B is a block diagram of an exemplary computer system that may be used to perform one or more of the operations described herein.

FIG. 1B is a block diagram of an exemplary computer system 130 (e.g., a machine hosting GUI 103 and/or a curve generator 102) that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 130 includes a processor 128, a main memory 132 and a static memory 106, which communicate with each other via a bus 108. The computer system 130 may further include a video display unit 110 (e.g., a liquid crystal display (LCD) or a cathode ray tube (CRT)). In one embodiment, the computer system 130 also includes a pen digitizer 113 and accompanying pen or stylus (not shown) to digitally capture freehand input. Although the digitizer 113 is shown apart from the video display unit 110, the usable input area of the digitizer 113 may be co-extensive with the display area of the display unit 110. Further, the digitizer 113 may be integrated in the display unit 110, or may exist as a separate device overlaying or otherwise appended to the display unit 110.

The computer system 130 also includes an alpha-numeric input device 112 (e.g., a keyboard), a cursor control device 114 (e.g., a mouse), a disk drive unit 116, a signal generation device 120 (e.g., a speaker) and a network interface device 122.

The disk drive unit 116 includes a computer-readable medium 124 on which is stored a set of instructions (i.e., software) 126 embodying any one, or all, of the methodologies described above. The software 126 is also shown to reside, completely or at least partially, within the main memory 132 and/or within the processor 128. The software 126 may further be transmitted or received via the network interface device 122. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to include, but not be limited to, solid-state memories, optical and magnetic disks, and carrier wave signals.

Figure 2:
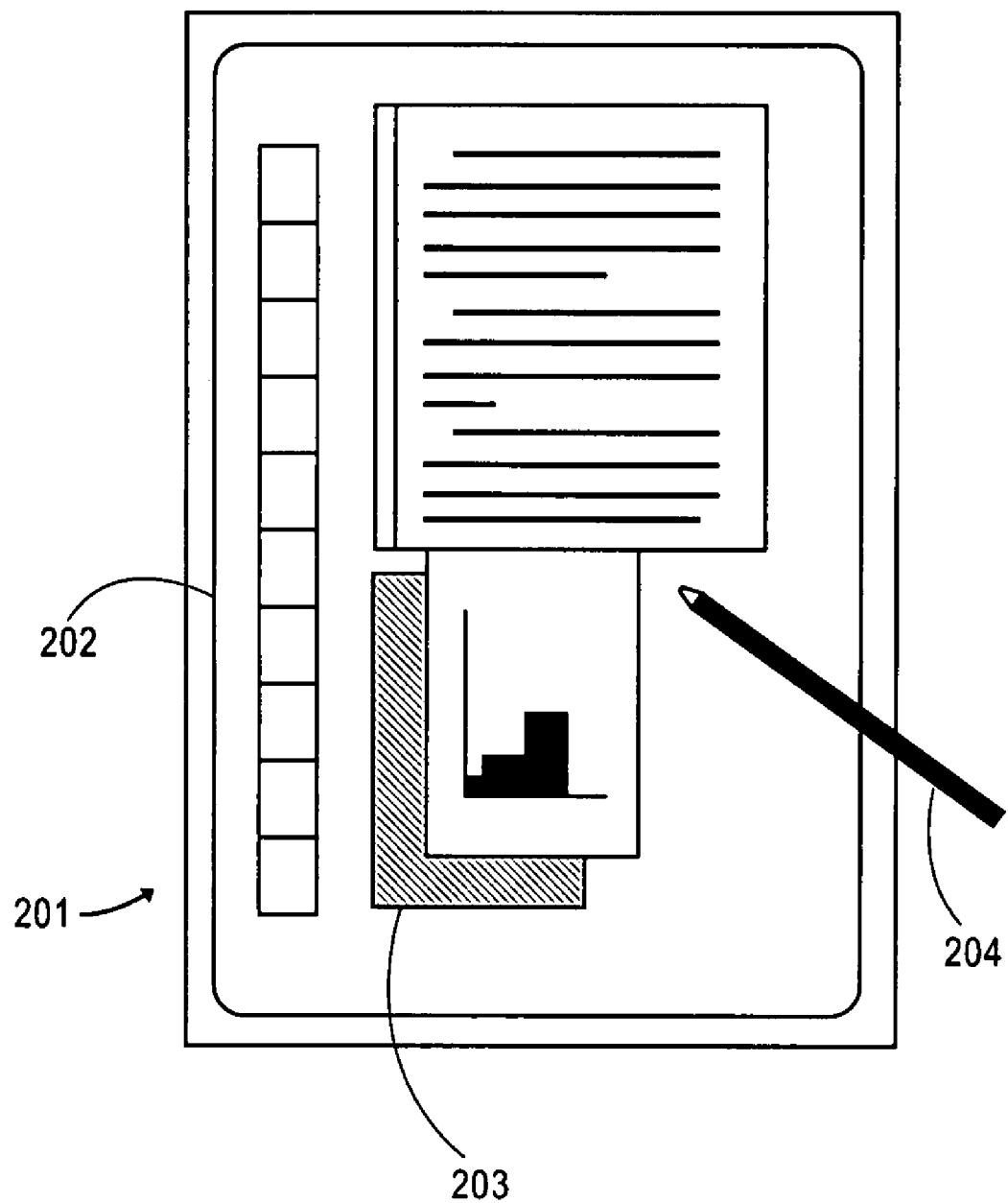
FIG. 2 illustrates an exemplary tablet and stylus computer that can be used with embodiments of the present invention.

FIG. 2 illustrates a tablet and stylus computer that can be used in accordance with some embodiments of the invention. Any or all of the features, subsystems, and functions in the system of FIG. 1B can be included in the computer of FIG. 2. Tablet PC 201 includes a large display surface 202, e.g., a digitizing flat panel display such as a liquid crystal display (LCD) screen, on which a plurality of windows 203 is displayed. Using stylus 204, a user can create, select, highlight, move, rotate, and scale graphical objects on the digitizing display area. Examples of suitable digitizing display panels include electromagnetic pen digitizers, such as the Mutoh or Wacom pen digitizers. Other types of pen digitizers, e.g., optical digitizers, may also be used. The computer 201 interprets input made using stylus 204 in order to enter and manipulate data, enter text, and execute conventional computer application tasks such as spreadsheets, word processing programs, and the like.

A stylus may be equipped with buttons or other features to augment its selection capabilities. In one embodiment, a stylus could be implemented as a "pencil" or "pen", in which one end constitutes a writing portion and the other end constitutes an "eraser" end, and which, when moved across the display, indicates portions of the display to be erased. Other types of input devices, such as a mouse, trackball, or the like could be used. Additionally, a user's own finger could be used for selecting or indicating portions of the displayed image on a touch-sensitive or proximity-sensitive display. Consequently, the term "user input device", as used herein, is intended to have a broad definition and encompasses many variations on well-known input devices.

Curve Fitting Functionality

Figure 3:
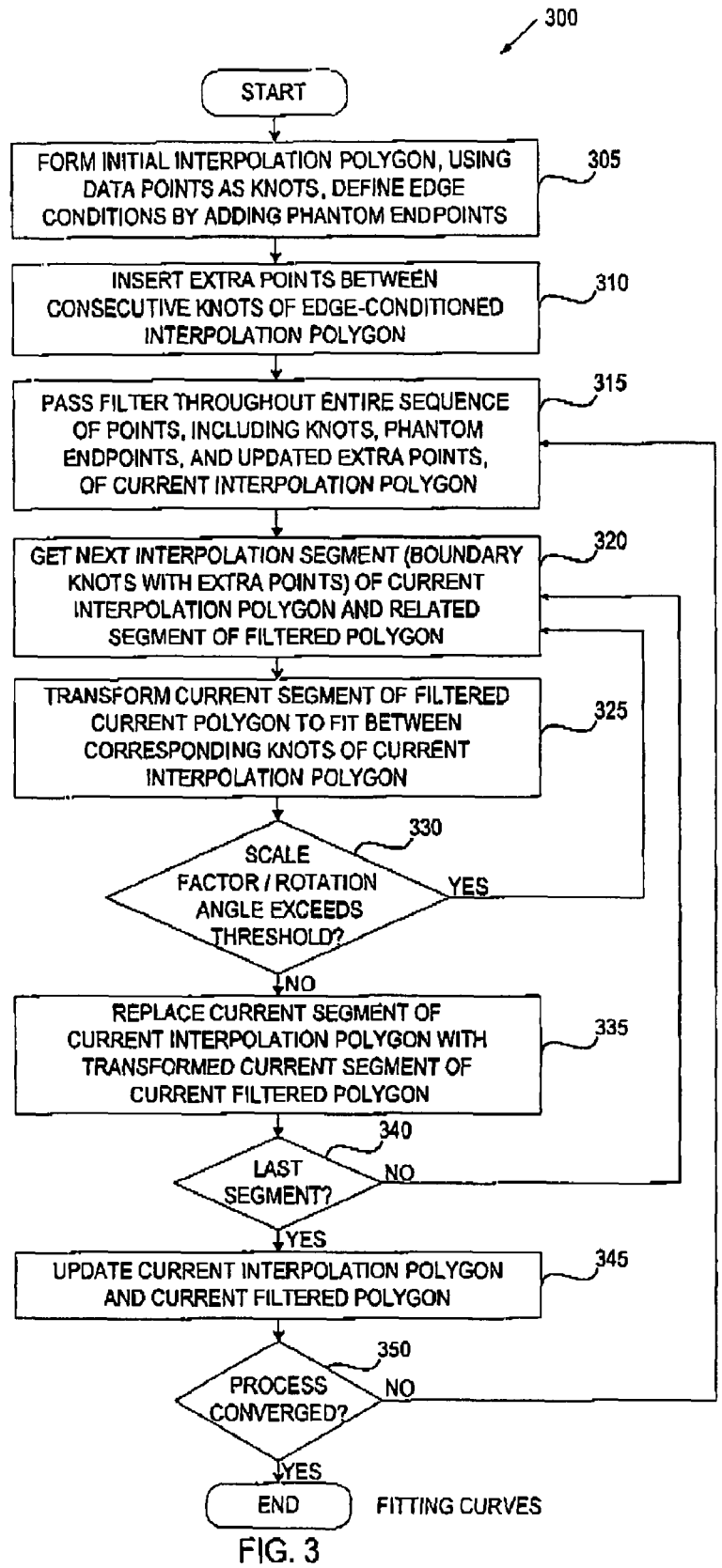
FIG. 3 is a flow diagram of one embodiment of a curve fitting method.

FIG. 3 is a flow diagram of a curve fitting method 300 according to some embodiments of the invention. The method may be performed by processing logic that may comprise hardware (e.g., circuitry, dedicated logic, etc.), software (such as run on a general purpose computer system or a dedicated machine), or a combination of both.

Referring to FIG. 3, method 300 begins with processing logic forming a source polygon associated with the input sequence of data points (block 305). In particular, processing logic forms a source interpolation polygon using the data points as interpolation knots. In one embodiment, processing logic extends the source interpolation polygon by defining two additional knots as the "phantom" endpoints of the polygon. The extended polygon may be designated as an edge-conditioned polygon, and a segment between two consecutive knots of the edge-conditioned polygon may be designated as an interpolation segment.

At block 310, processing logic performs, based on a desired density of points for a fitting curve, upsampling of the edge-conditioned polygon by inserting extra points in interpolation segments. The number of extra points may or may not be the same for all segments. Processing logic then stores the edge-conditioned, upsampled polygon in an updatable form. This initially stored version of the edge-conditioned, upsampled polygon may be designated as a first interpolation polygon.

Figure 4A:
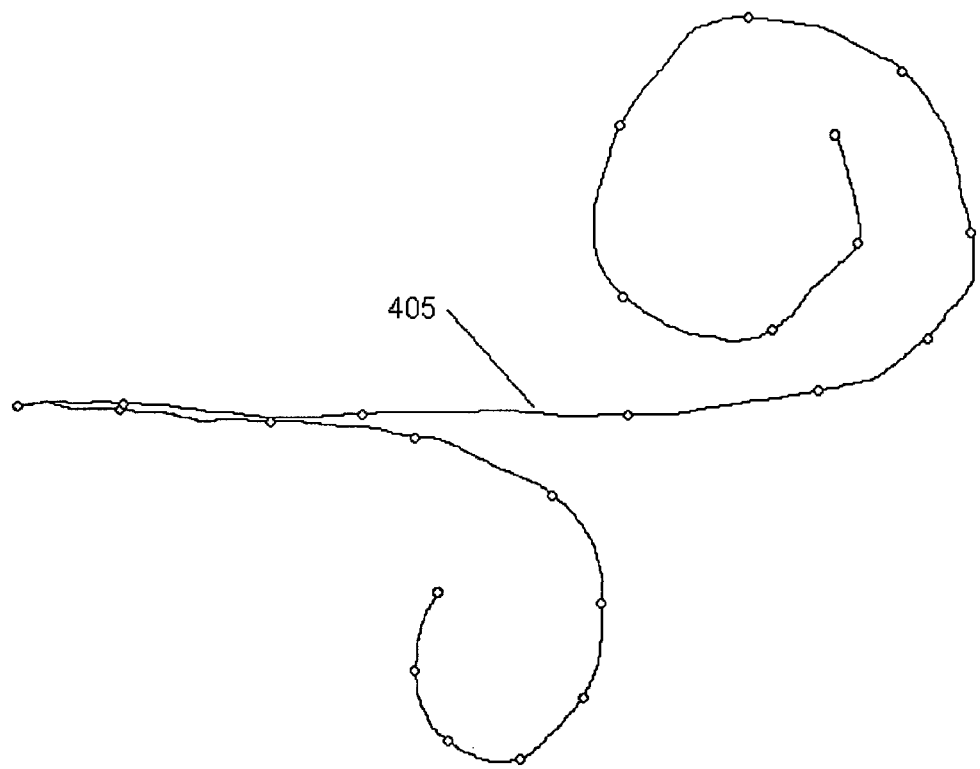
FIGS. 4A-4B, 5A-5D, 6A-6D illustrate the curve fitting functionality according to some embodiments of the invention.
Figure 4B:
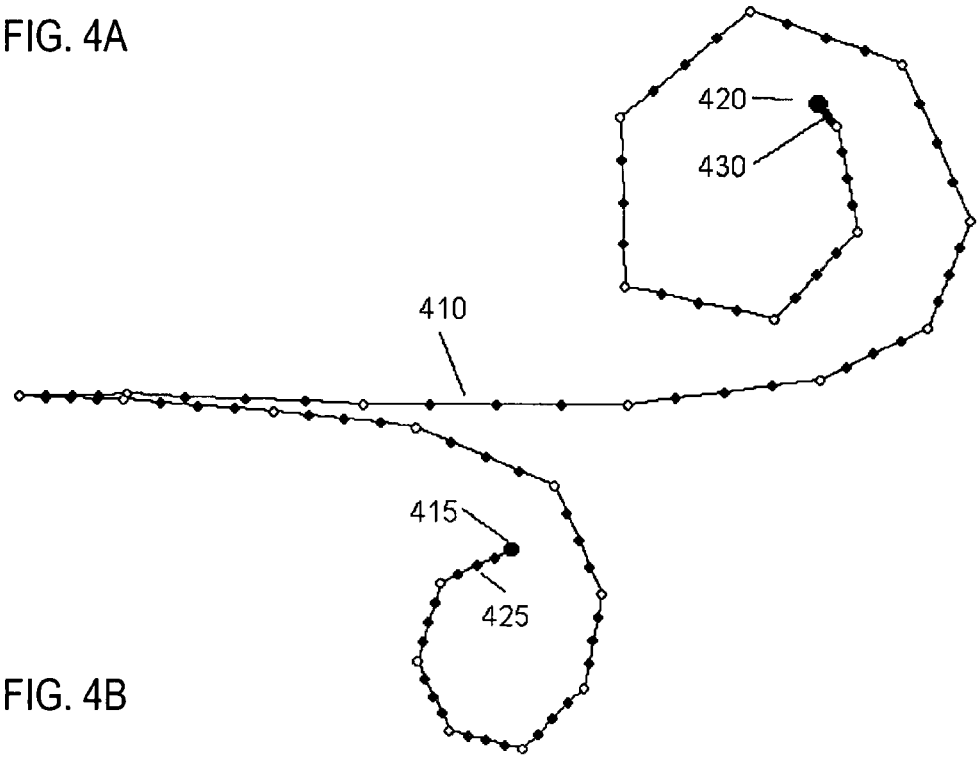

FIGS. 4A and 4B illustrate the formation of an exemplary first interpolation polygon in a curve design process, according to one embodiment of the invention. FIG. 4A shows a rough presentation 405 of a desired curve along with a sequence of data points defined by a user to initiate an interactive design. In this example, the initial sequence contains 24 points (shown as white circles). Two additional knots may be defined arbitrarily by a user or provided by processing logic using default edge conditions.

FIG. 4B shows a resulting first interpolation polygon 410 having 26 knots, including two phantom endpoint knots 415 and 420, and 75 extra points (shown as black circles), totally 101 points. In this particular example, the same number D=3 of extra points are inserted in each interpolation segment, including phantom segments 425 and 430, in accordance with one embodiment of the invention.

Returning to FIG. 3, at block 315, processing logic begins an iterative cycle of global filtering-piecewise transformation by passing a filter throughout all points of the first interpolation polygon, including knots, phantom knots, and extra points. Processing logic then stores the resulting filtered polygon in an updatable form. The filtered polygon obtained at the first cycle is designated a first filtered polygon. In this example, a simple 3-tap rectangular (moving average) filter is used to run the cycle of global filtering-piecewise transformation, as illustrated in FIGS. 4-7.

The sequence of 101 two-coordinate points representing the exemplary interpolation polygon can be denoted as follows:

$\{x_{n,i}, y_{n,i}\}$; n=0, 1, 2, ..., 100; i=1, 2, ..., (1) and the sequence derived from (1) to represent the filtered polygon can be denoted as follows:

$\{\tilde{x}_{n,i}, \tilde{y}_{n,i}\}$; n=0, 1, 2, ..., 100; i=1, 2, ... (2) In expressions (1) and (2) n enumerates the points and i denotes the number of the current cycle (i=1 at this stage of the process). At any given cycle, the sequence (2) of filtered points was produced as follows:

$$\tilde{x}_{n,i} = \frac{1}{3}(x_{n-1,i} + x_{n,i} + x_{n+1,i}); \quad (3)$$

$$\tilde{y}_{n,i} = \frac{1}{3}(x_{n-1,i} + x_{n,i} + x_{n+1,i}), \quad \text{where}$$

where $(x_{-1,i}=x_{0,i}, y_{-1,i}=y_{0,i})$ and $(x_{101,i}=x_{100,i}, y_{101,i}=y_{100,i})$ are repetitive phantom points added to a sequence (1) in order to maintain the point-by-point correspondence between the interpolation polygon and the filtered polygon. The segments of filtered polygon corresponding to interpolation segments are designated reference segments.

Figure 5A:
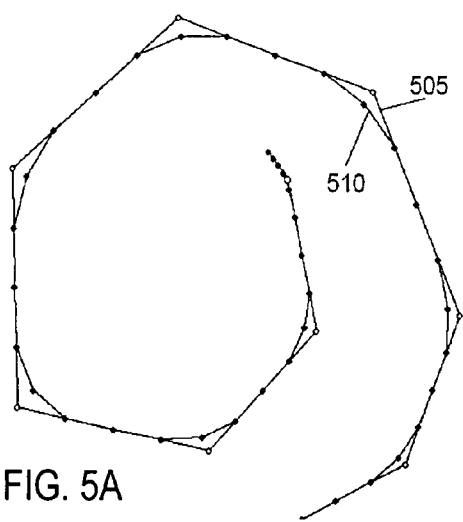

FIG. 5A shows an exemplary magnified fragment of the first filtered polygon 510 derived from the first interpolation polygon 505 in accordance with expression (3). The fragment contains 9 complete interpolation segments, including a phantom segment, and, correspondingly, 9 reference segments.

Returning to FIG. 3, at block 320, processing logic begins the piecewise reshaping of the interpolation polygon. Each interpolation segment is reshaped using a corresponding reference segment. The first interpolation segment and the related reference segment are obtained at block 320 to begin the piecewise reshaping.

At block 325, processing logic performs a geometrical transformation of the reference segment in order to have the transformed segment fitted between the knots of the corresponding interpolation segment. For example, the similarity transformations (translation, rotation, and scaling) can be used to have the endpoints of the transformed segment superimposed onto respective interpolation knots. The reference segment so transformed is intended to replace the corresponding interpolation segment. In one embodiment, prior to actual replacement, processing logic determines whether the transformation parameters defined for a given reference segment are in the range acceptable for stability conditions (block 330).

The stability conditions are used to ensure that the iterative filtering-transformation process will converge to the desired fitting curve (that the process will stay in the zone of attraction to desired result). There are some methods known in the art that are designed to prevent the iterative processes that have multiple attractors from running outside of the desired attraction zone.

In one embodiment, the curve generation process is stabilized using the following procedure. The angle of rotation and the scaling factor defined for the transformation of the current reference segment are checked to see whether either of them exceeds a respective predetermined threshold. For example, the threshold for the absolute value of the rotation angle (the angle between the chords of interpolation and reference segments brought to common origin) can be chosen as 10 degrees, and for scaling factor (the ratio between the lengths of respective chords) as 120%. If either threshold is exceeded, a linear barycentric combination (blend) of the interpolation segment and respective reference segment is formed, with the relative weight of the reference segment reduced as needed to keep the rotation angle and scaling factor for the combined segment below the respective thresholds. The segment so blended and transformed can be then used as a replacement for the interpolation segment.

A simplified version of the above described stabilization procedure is illustrated in FIG. 3, according to one embodiment of the invention. If either threshold is exceeded, the current interpolation segment is left unchanged, and processing logic moves to the next segment (block 320). If the stability conditions are not violated, processing logic replaces the interpolation segment with the transformed reference segment (block 330). Thus, the above described blending is reduced to setting the weight of the reference segment to zero if stability conditions are violated and to 100% otherwise.

It should be noted that if an unchanged segment occurs at a given iteration, the replacement of its successors with a transformed reference segment is likely to be resumed at further iterations.

If the currently processed segment is not the last segment (block 340), processing logic moves to the next segment (block 320). Alternatively, the current cycle of global filtering-piecewise transformation is over, and processing logic stores the current versions of the filtered polygon and interpolation polygon in an updatable form (block 345). It should be noted that all successive interpolation polygons obtained in the process may preserve the same interpolation knots, as they were determined at blocks 305 and 310.

At block 350, processing logic checks whether the process has converged. In one embodiment, processing logic compares the current interpolation polygon and the previous interpolation polygon to determine whether a change in any interpolation segment exceeds a threshold. If so, processing logic proceeds to the next iteration. If not, processing logic stops. The threshold can be defined, for example, as a mean-square distance between intermediate points of the current segment, on one hand, and respective points obtained at the previous iteration, on the other hand.

Figure 5B:
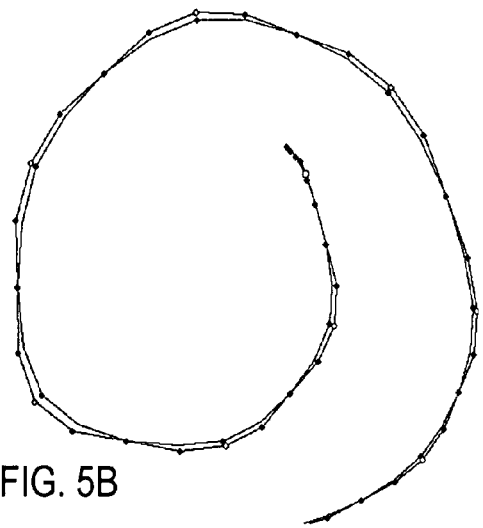
Figure 5C:
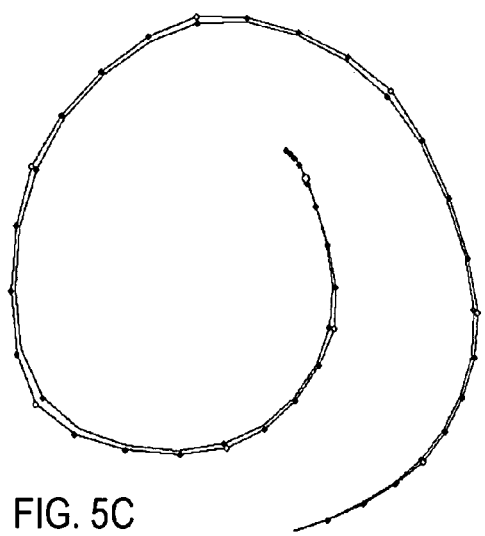

An exemplary process illustrated in FIG. 4 has converged after 6 iterations. FIGS. 5A-5D illustrate, in succession, the fragments of first, second, fourth, and sixth interpolation polygons obtained in this process, along with respective filtered polygons. As can be seen in FIGS. 5A and 5B, the shape of each reference segment is transferred, at the next iteration, to a respective interpolation segment. As it can also be seen, both the interpolation polygon and filtered polygon are undergoing rapid improvement, in terms of smoothness and appearance, and are getting closer to each other. Finally, as the process converges (FIG. 5D), the shapes of interpolation segments are reproduced by global filtering without change, up to similarity transformations, in respective reference segments.

Figure 6A:
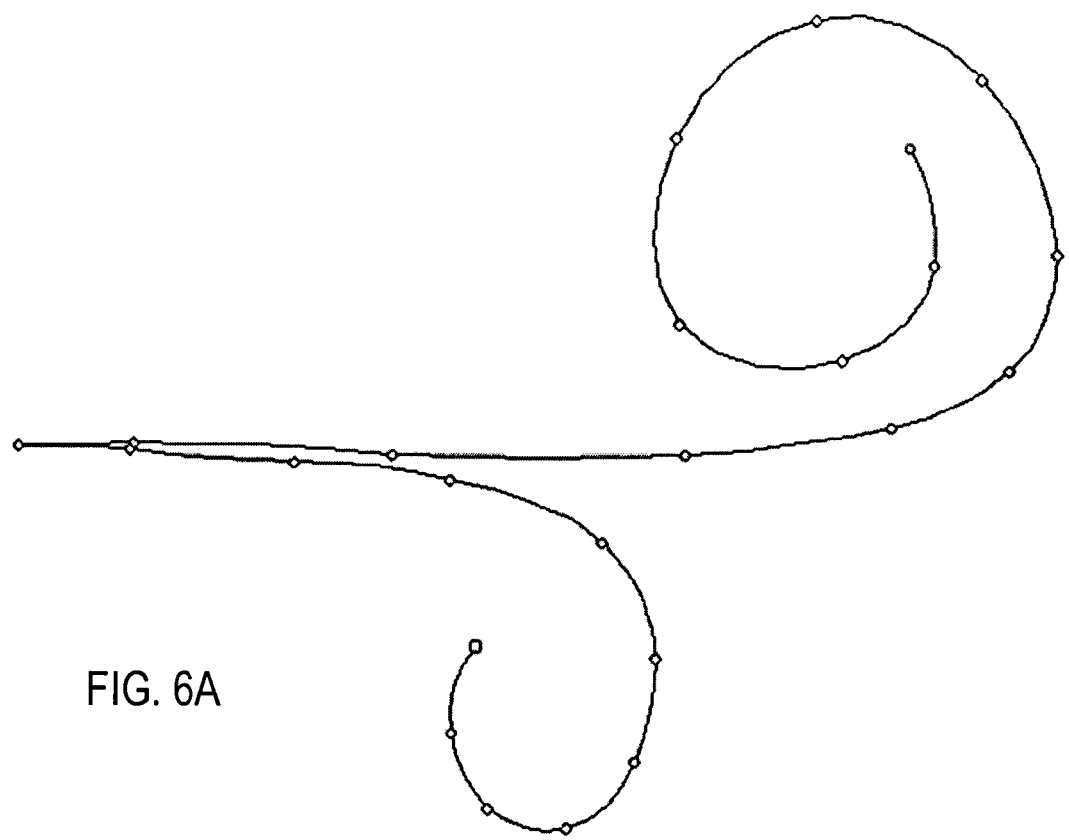
Figure 6B:
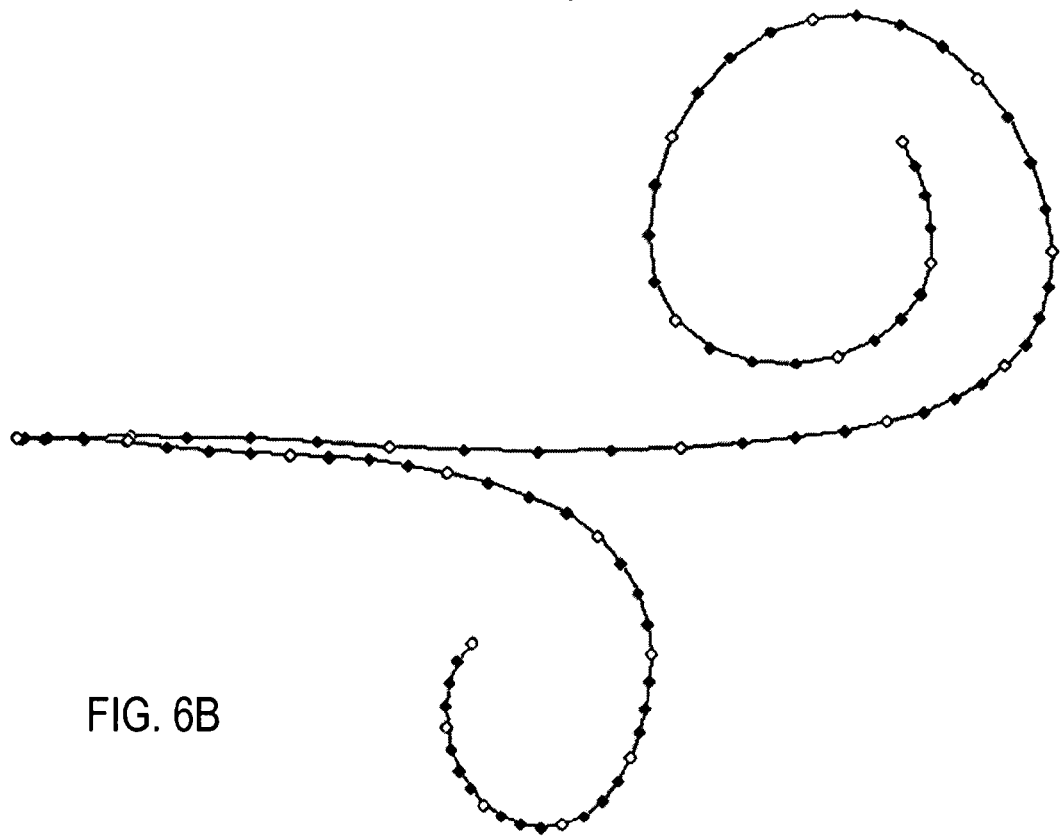
Figure 6C:
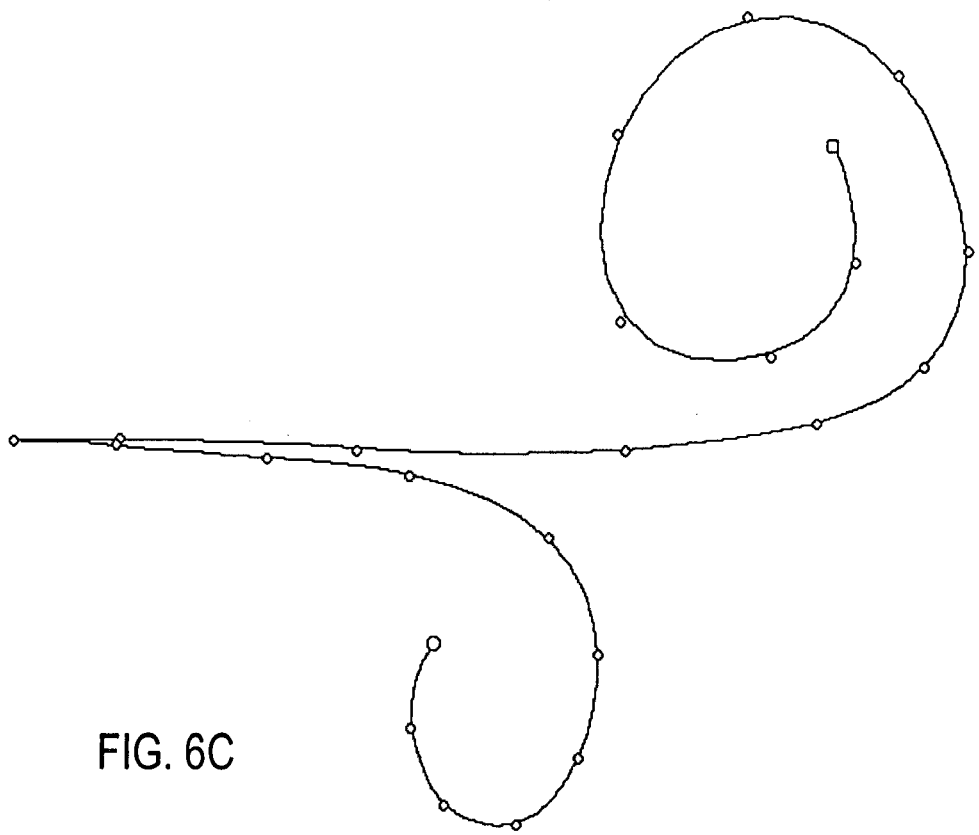
Figure 6D:
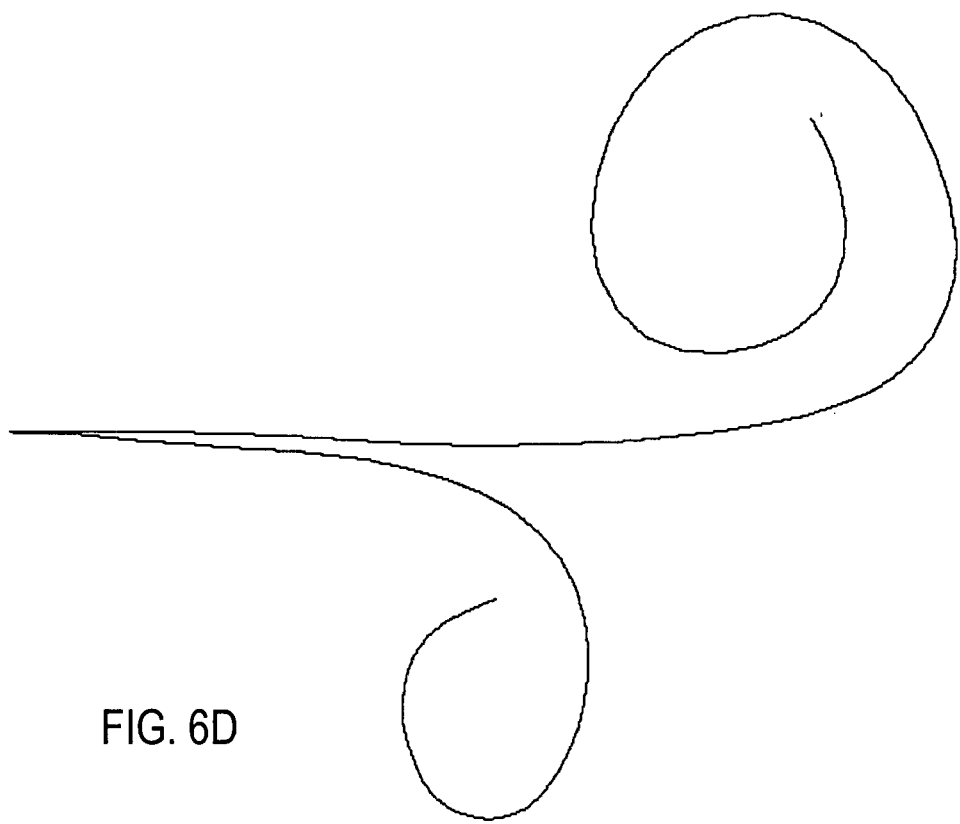

FIGS. 6A-6D show finally obtained fitting curves in their entirety, with phantom segments removed from the view. The final interpolation polygon is shown in FIG. 6A along with input data points (interpolation knots). FIG. 6B illustrates the final interpolation polygon with extra points to illustrate the final allocation of points along the curve. A final filtered polygon is shown in FIG. 6C against the input data points and in FIG. 6D as a stand-alone curve.

Fitting Adjustment Functionality

According to some embodiments of the present invention, variations in filtering parameters may be used for basic adjustments of fitting curves. Such variations can control the fitting curves in terms of their spectral contents. In one embodiment, once the curve generation process ends, either the latest interpolation polygon or a related filtered polygon can be chosen as a fitting result. The former is a truly interpolative fit to data points, but it may have some residual imperfections, in terms of smoothness and continuity, at the joints between interpolation segments. The latter may deviate to some extent from data points, but its smoothness is ensured by the limited pass band of the filter used to run the process.

The filtered polygon, in particular, may be preferable in case of noisy data points. If neither one of two fitting curves is acceptable for a given application, another filter, with broader pass band, can be used to continue the curve generation process. Generally, for a given data points, the broader is the pass band, the closer to each other are the resulting interpolation polygon and the filtered polygon, up to practical identity for a given application.

FIG. 7 illustrates an example of how a broader pass band may affect the resulting fit. For this example, the higher point density was chosen for the fitting curves: 29 extra points were inserted in each interpolation segment of the same edge-conditioned polygon. It should be noted that the number of extra points affects the relative pass band of a given filter. Under the same other conditions, a higher density of points results in a broader relative pass band of a given filter. To keep the relative pass band approximately the same, the 29-tap rectangular filter may be needed. For this example, a 9-tap triangular filter was used. As a result, the relative pass band was roughly twice as wide as in previous example.

Figure 7A:
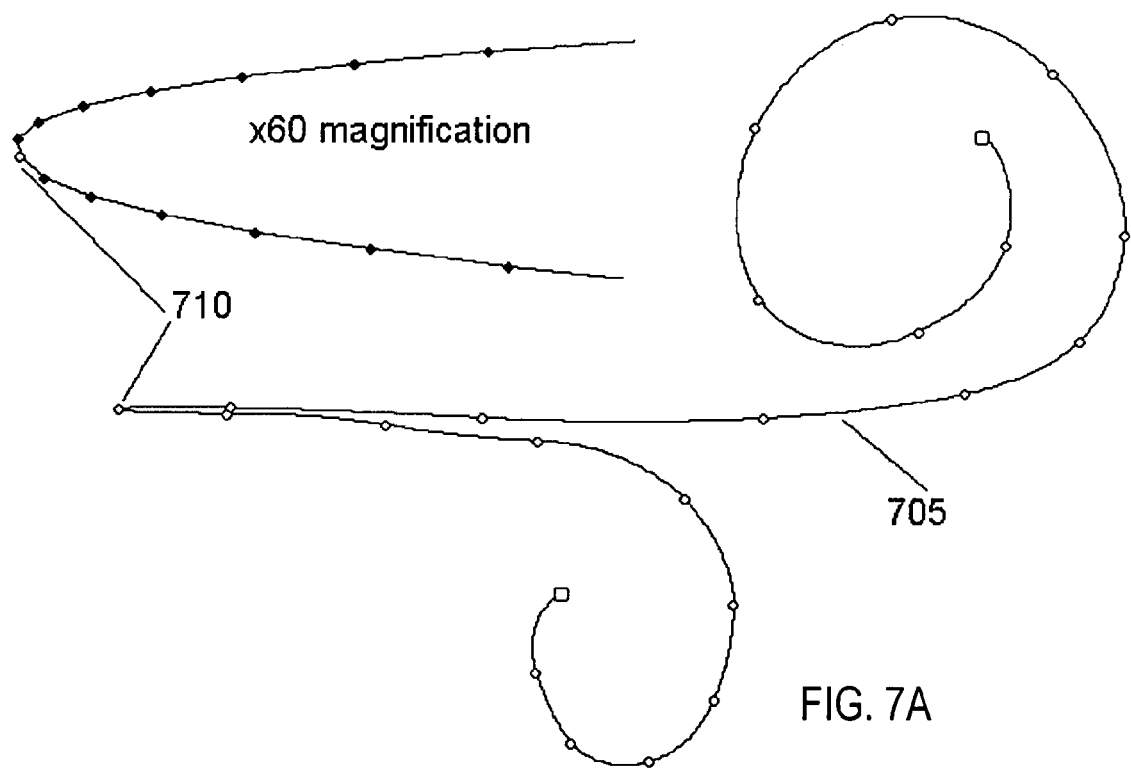
FIGS. 7A-7B illustrate the fit adjustment functionality according to some embodiments of the invention.

FIG. 7A shows a resulting filtered polygon 705 against input data points (interpolation knots). As shown, the filtered polygon 705 practically interpolates the data points. To illustrate the smoothness and continuity of the fit, a top of the cusp 710 is additionally shown with ×60 magnification, along with extra points as they are finally allocated along the resulting interpolation polygon.

Figure 5D:
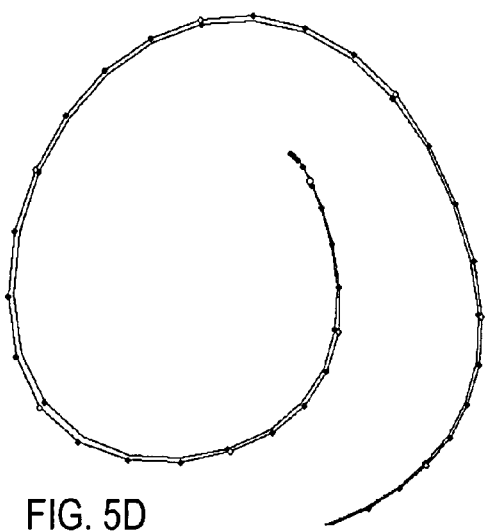
Figure 7B:
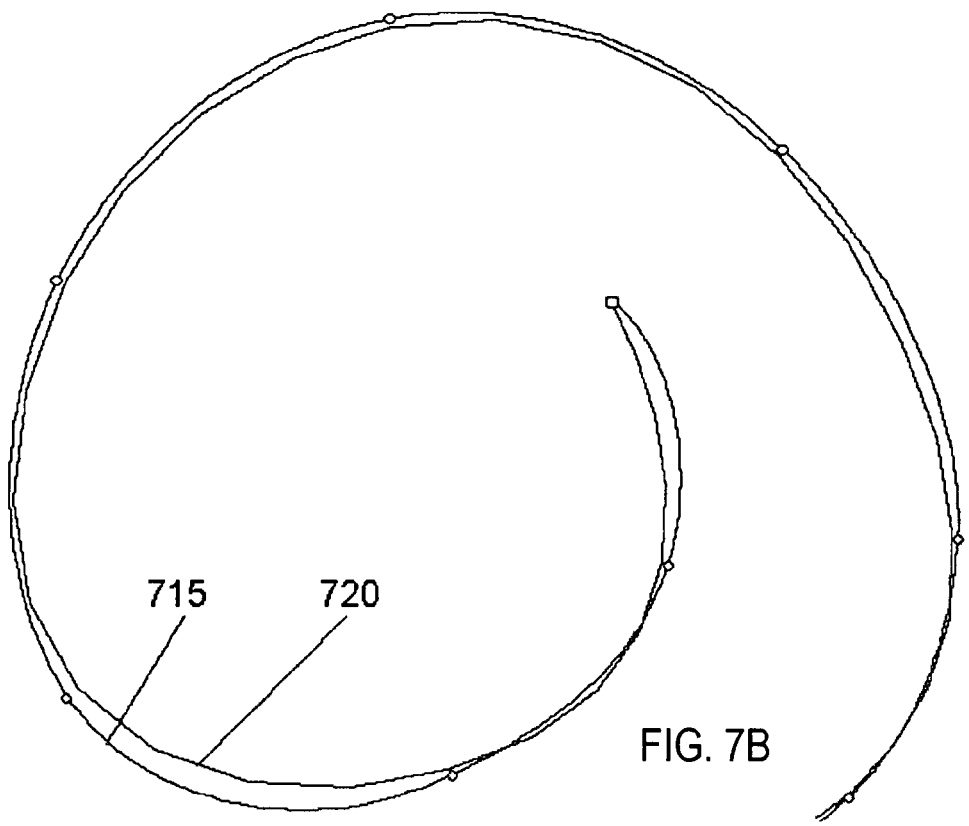

FIG. 7B shows a magnified fragment 715 of the filtered polygon against the data points, as well as a previous version 720 of the filtered polygon copied from FIG. 5D, for comparison.

In one embodiment, the pass band and other features of a filter are adjusted in the course of the curve generation process if needed. In particular, at each round of curve generation, the final filtered polygon can be kept automatically as close to the interpolation polygon as needed for a given application.

In addition to above described adjustments based on spectral contents, the fitting curves can be handled, in some embodiments of the invention, using manipulations analogous to spline adjustments, such as relocation of data points, variations in edge conditions, and reparameterization of interpolation knots.

The fitting curves can be adjusted by moving the data points, inserting the new data points, and removing the existing data points. This is similar to basic ways of spline adjustment.

To adjust the fitting curves using edge conditions, the length and orientation of phantom segments can be varied by moving the phantom endpoints. This is analogous to varying the tangent vectors assigned to the endpoints of polynomial splines.

The adjustment by reparameterization of interpolation knots (data points) can be implemented, in particular, by varying the number of extra points from one interpolation segment to another. This is analogous to varying parameter values assigned to the knots of polynomial splines. It should be noted that the number of extra points between a given pair of consecutive knots, not the initial allocation of extra points, is what matters. The result of the iterative global filtering-piecewise transformation will be the same. Since the density of extra points in either interpolation segment can be changed at any stage of the curve generation process, it is possible to perform the reparameterization of data points in real time, according to some embodiments of the invention.

The curve fitting process discussed herein is readily applicable to curves determined in spaces of arbitrary dimensionality (space curves). Once the input data are represented by a sequence of three-coordinate (more generally, multi-coordinate) points, a space curve can be fitted to such data in the same manner as described above. All polygons formed in the course of processing will be, in this case, space polygons.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A computerized method for curve generation, the method comprising:
    forming an initial interpolation polygon using samples within input data as interpolation knots;
    upsampling the interpolation polygon;
    passing a filter throughout a sequence of samples representing the upsampled interpolation polygon;
    substituting the interpolation polygon with the filtered polygon converted into a next interpolation polygon using segment-by-segment transformations, wherein segments of the filtered polygon are delimited by consecutive samples corresponding to interpolation knots, and each segment is transformed to fit between respective interpolation knots, and
    repeating the passing of the filter and the substituting of a current interpolation polygon until a predefined condition is satisfied, to provide fitting curves.

2. The method of claim 1 wherein upsampling the interpolation polygon comprises:
    inserting a set of extra samples in each segment of the interpolation polygon, wherein segments of the interpolation polygon are delimited by interpolation knots.

3. The method of claim 2 wherein the set of extra samples is the same for each segment or varies between segments.

4. The method of claim 2 further comprising:
    adjusting the fitting curves by varying a number of inserted extra samples between segments.

5. The method of claim 4 wherein the number of inserted extra samples varies while the passing of the filter is repeated.

6. The method of claim 1 wherein forming the initial interpolation polygon comprises:
    extending the initial interpolation polygon by defining additional interpolation knots as endpoints of the initial interpolation polygon.

7. The method of claim 6 further comprising:
    adjusting the fitting curves by modifying edge conditions of the interpolation polygon while repeating the passing of the filter, the edge conditions being adjusted by moving the added endpoints.

8. The method of claim 1 wherein each segment of the filtered polygon is transformed using similarity transformations.

9. The method of claim 1 wherein substituting the interpolation polygon comprises: if stability conditions for a transformed segment of the filtered polygon are violated, transforming a blend of the segment of the filtered polygon and a respective segment of the interpolation polygon, and performing the substitution of the respective segment of the interpolation polygon with the transformed blend.

10. The method of claim 9 wherein a weight of the segment of the filtered polygon in the blend is set to zero.

11. The method of claim 9 wherein the stability conditions assume that an angle of rotation and a scaling factor required for transformation of a segment are within corresponding thresholds.

12. The method of claim 1 wherein the fitting curve is represented by a last updated interpolation polygon or a corresponding filtered polygon.

13. The method of claim 1 further comprising;
    adjusting the fitting curves by modifying parameters of the filter while repeating the passing of the filter.

14. The method of claim 1 further comprising:
    adjusting the fitting curves by relocating interpolation knots of the interpolation polygon.

15. A non-transitory computer-readable storage medium having executable instructions to cause a computer system to perform a method for curve generation, the method comprising:
    forming an initial interpolation polygon using samples within input data as interpolation knots;
    upsampling the interpolation polygon;
    passing a filter throughout a sequence of samples representing the upsampled interpolation polygon;
    substituting the interpolation polygon with the filtered polygon converted into a next interpolation polygon using segment-by-segment transformations, wherein segments of the filtered polygon are delimited by consecutive samples corresponding to interpolation knots, and each segment is transformed to fit between respective interpolation knots, and
    repeating the passing of the filter and the substituting of a current interpolation polygon until a predefined condition is satisfied, to provide fitting curves.

16. The non-transitory computer-readable storage medium of claim 15 wherein each segment of the filtered polygon is transformed using similarity transformations.

17. The non-transitory computer-readable storage medium of claim 16 wherein substituting the interpolation polygon comprises:
    if stability conditions for a transformed segment of the filtered polygon are violated, transforming a blend of the segment of the filtered polygon and a respective segment of the interpolation polygon, and performing the substitution of the respective segment of the interpolation polygon with the transformed blend.

18. The non-transitory computer-readable storage medium of claim 17 wherein:
    a weight of the segment of the filtered polygon in the blend is set to zero; and the stability conditions assume that an angle of rotation and a scaling factor required for transformation of the segment are within corresponding thresholds.

19. The non-transitory computer-readable storage medium of claim 15 wherein the method further comprises adjusting the fitting curves by at least one of a plurality of operations comprising:
- modifying parameters of the filter while repeating the passing of the filter;
- modifying edge conditions of the interpolation polygon while repeating the passing of the filter, the edge conditions being adjusted by moving the added endpoints;
- varying a number of inserted extra samples between segments; and
- relocating interpolation knots of the interpolation polygon.

20. A system comprising:
- a curve generator to form an initial interpolation polygon using samples within input data as interpolation knots, to upsample the interpolation polygon, to pass a filter throughout a sequence of samples representing the upsampled interpolation polygon, to substitute the interpolation polygon with the filtered polygon converted into a next interpolation polygon using segment-by-segment transformations, wherein segments of the filtered polygon are delimited by consecutive samples corresponding to interpolation knots, and each segment is transformed to fit between respective interpolation knots, and to repeat the passing of the filter and the substituting of a current interpolation polygon until a predefined condition is satisfied, to provide fitting curves; and
- a data repository, coupled to the curve generator, to store the fitting curves.

21. The system of claim 20 wherein the curve generator is to transform each segment of the filtered polygon using similarity transformations.

22. The system of claim 20 wherein the curve generator is to substitute the interpolation polygon by
- determining for each transformed segment of the filtered polygon whether the stability conditions for substituting a respective segment of the interpolation polygon are violated,
- if stability conditions for a transformed segment of the filtered polygon are violated, transforming a blend of the segment of the filtered polygon and a respective segment of the interpolation polygon, and
- performing the substitution of the respective segment of the interpolation polygon with the transformed blend.

23. The system of claim 22 wherein a weight of the segment of the filtered polygon in the blend is set to zero.

24. The system of claim 22 wherein:
the stability conditions assume that an angle of rotation and a scaling factor required for transformation of a segment are within corresponding thresholds.

25. The system of claim 20 wherein the curve generator is to adjust the fitting curves by at least one of a plurality of operations comprising:
- modifying parameters of the filter while repeating the passing of the filter;
- modifying edge conditions of the interpolation polygon while repeating the passing of the filter, the edge conditions being adjusted by moving the added endpoints;
- varying a number of inserted extra samples between segments; and
- relocating interpolation knots of the interpolation polygon.

* * * * *